Dec. 6, 1960 J. N. WOGNUM 2,963,144
CONVEYOR BELT
Filed April 26, 1956 2 Sheets-Sheet 1
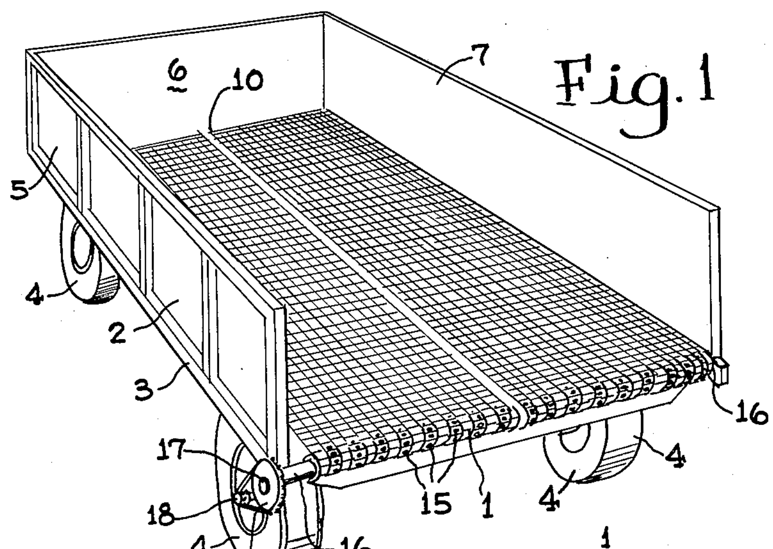
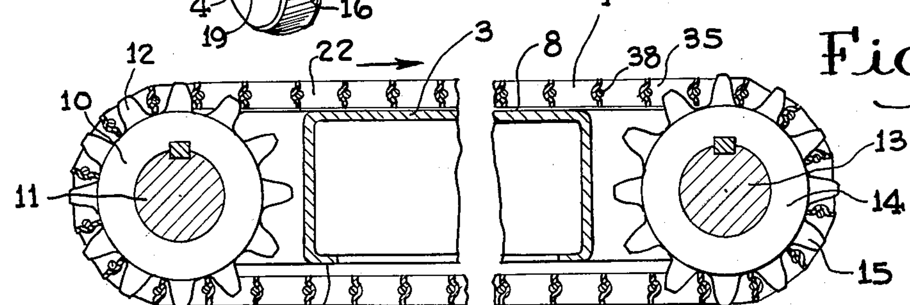
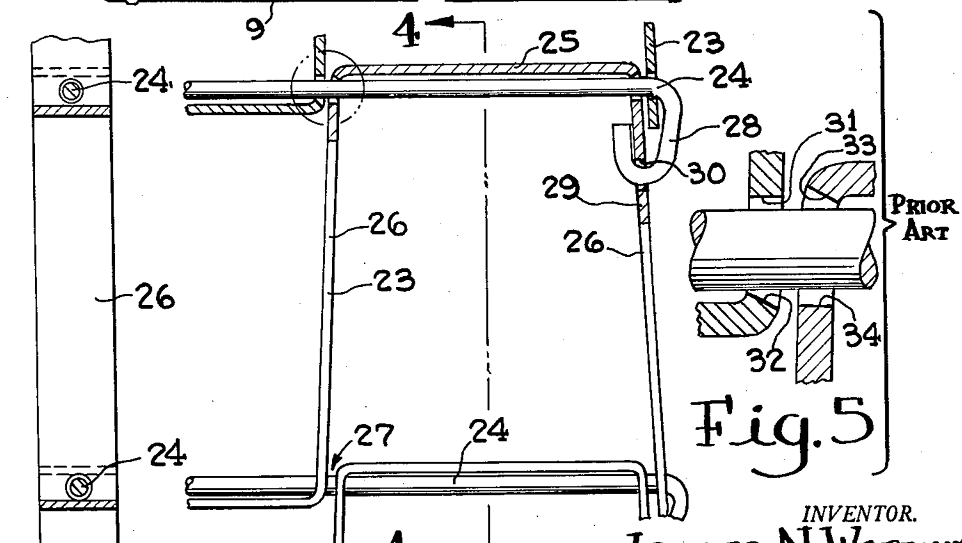
INVENTOR.
James N Wognum
BY
William P. Porcelli
Atty Dec. 6, 1960 | J. N. WOGNUM | 2,963,144
CONVEYOR BELT
Filed April 26, 1956 | 2 Sheets-Sheet 2
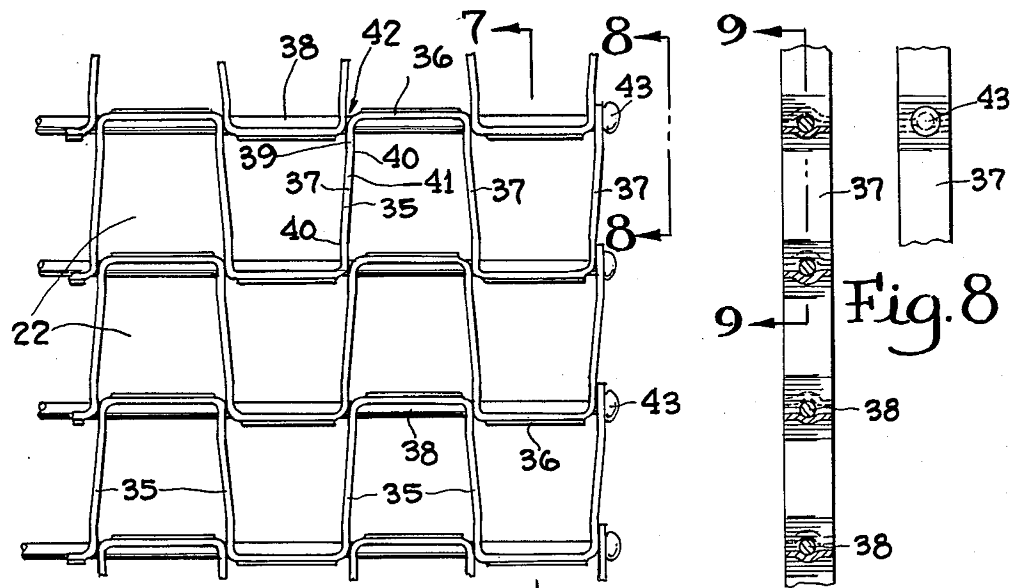
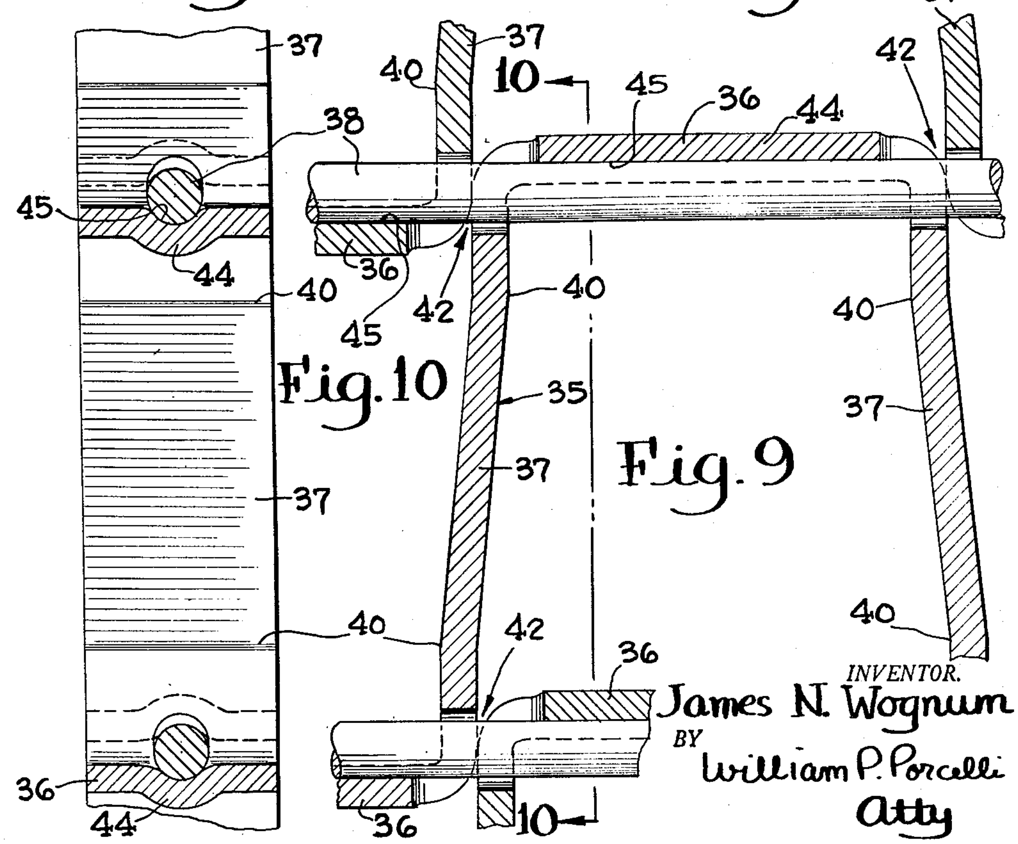
INVENTOR.
James N. Wognum
BY
William P. Porcelli
Atty United States Patent Office 2,963,144

Patented Dec. 6, 1960

2,963,144

CONVEYOR BELT

James N. Wognum, Chicago, Ill., assignor to Helix Corporation, Crown Point, Ind., a corporation of Indiana Filed Apr. 26, 1956, Ser. No. 580,790

2 Claims. (Cl. 198—193)

This invention relates to improvements in conveyor belts and particularly to improvements in a conveyor belt composed of a plurality of articulated members assembled in a simple and efficient manner.

In the manufacture of conveyor belts for use on various types of farm machinery wherein the conveyor belts are used for distribution of grain or feed or other materials from a mobile vehicle, presently used conveyor belts have certain disadvantages. Among the disadvantages is excessive wear of pivoted parts causing a longitudinal belt stretching which must be overcome by the provision of an adjustable belt tightener or by removal of entire linkages from the conveyor belt. Another cause for belt stretching is that the individual belt linkages, when subject to tension as is ordinarily required as the conveyor belt is driven, contract laterally to result in a binding condition between adjacent linkage portions as well as on sprocket teeth used for driving the belt. This lateral contraction of the linkages also creates misalignment of the belt linkages with the teeth of the sprockets used for driving the belt. The principal object of this invention is to overcome the disadvantages of presently used conveyor belts of this type by providing an improved conveyor belt embodying features which minimize longitudinal belt stretching and lateral contraction which causes binding of the belt segments between each other and with the sprocket teeth used for driving the belt and misalignment of the belt linkages with the driving sprocket teeth.

In order to achieve this object, it is another object of the invention to provide an articulated conveyor belt provided with maximum area bearing surfaces at the pivoted connections between adjacent conveyor belt linkages in order to minimize wear and consequent belt stretching.

It is still another object of the invention to provide an articulated conveyor belt provided with belt linkages designed to eliminate lateral clearance between adjacent linkage portions in order to minimize lateral contraction of the conveyor belt when subject to the ordinary tension produced as the conveyor belt is driven.

With previous belts, due to lateral clearance between adjacent linkage portions, it was necessary to provide a complex pivot pin end in order to engage the pin ends with the ends of linkages to prevent lateral contraction of the linkages. It is another object of this invention to provide a belt construction permitting a simpler and less expensive conveyor belt linkage pivot pin end construction because of elimination of lateral clearance between adjacent linkage portions and the consequent need to prevent lateral contraction of the linkages.

The invention can be better understood by referring to the accompanying drawings, Figure 1 shows a farm wagon provided with a movable conveyor belt which is used for unloading grain or other material from the body of the wagon;

Fig. 2 shows a cross-sectional view of the conveyor belt of this invention in engagement with an idler sprocket and a sprocket for driving the conveyor belt as customarily mounted on a wagon such as that shown in Fig. 1;

Fig. 3 shows a partial cross-sectional view of a portion of conveyor belt made according to the prior art and which is typical of the conveyor belt over which this invention is an improvement;

Fig. 4 shows a sectional view of the conveyor belt as shown in Fig. 3 and taken along the line 4—4;

Fig. 5 shows an enlarged portion of the upper left hand corner of the view shown in Fig. 3 of the conveyor belt;

Fig. 6 shows a portion of conveyor belt made according to the present invention;

Fig. 7 shows a sectional view of the conveyor belt shown in Fig. 6 as viewed along the line 7—7;

Fig. 8 shows a side view of a portion of the conveyor belt as viewed along line 8—8 of Fig. 7;

Fig. 9 shows a sectional view of the conveyor belt as shown in Fig. 7 and viewed along the line 9—9; and Fig. 10 shows a sectional view of a portion of the conveyor belt shown in Fig. 9 as viewed along the line 10—10.

As shown in Figs. 1 and 2 the conveyor belt 1 of this invention may be used on a farm wagon 2 provided with a platform 3 supported by conventional wheels 4 and having three walls 5, 6 and 7 extending vertically upward therefrom. These walls, 5, 6 and 7 are used as retainer walls to prevent the loss of grain or other materials which may be carried on the wagon. The platform 3 extends for the length of the vehicle and is covered by an articulated conveyor belt 1 which feeds over the upper surface 8 of the platform 3 and below its lower surface 9. An idler sprocket 10 is provided adjacent the forward end of the wagon and is mounted on a shaft 11 which is trunnioned in bearings in opposite sides of the platform 3. The sprocket 10 is provided with radially extending teeth 12 which project through openings in the conveyor belt 1 and contact the belt segments. Several sets of these radially extending teeth 12 are provided along the sprocket 10 in order to contact the conveyor belt at many points. At the rear end of the wagon is provided a shaft 13 which also carries a sprocket 14 provided with radially extending teeth 15 for projecting through openings in the conveyor belt 1 and contacting the conveyor segments to drive it upon rotation of the shaft 13 on which the sprocket 14 is mounted. The shaft 13 is trunnioned on the platform 3 at the rear end of the wagon in bearings 16 mounted on opposite sides of the platform 3 in a manner similar to the mounting of the shaft 11 on which the sprocket 10 is mounted. However, this shaft 13 is provided with an additional sprocket 17 at its one end which is driven by means of another sprocket 18 through a chain 19. The sprocket 18 is driven through a conventional gearing system, not shown, from the wheels 4 of the vehicle as the vehicle is pulled by a tractor or other power device. Otherwise, a separate motor may be mounted beneath the platform 3 in order to drive the conveyor belt independently of the motion of the wagon.

As shown in Fig. 1, the conveyor belt 1 covers the entire upper surface 8 of the platform 3 so that when the wagon is filled, grain or other material covers the conveyor belt. As the wagon 2 is moved forward, the conveyor belt 1 is driven by means of the sprocket 14 in such a manner that the grain or other material is fed from beneath its pile by means of the conveyor belt 1 and it is, therefore, distributed or removed from the rear end of the wagon. If a separate motor is used acting independently of the wheels 4, of course the wagon need not be in motion.

As shown in Fig. 2, the conveyor belt 1 is composed of a plurality of conveyor segments 35 which are linked together by means of pivot pins 38. These pivot pins 38 permit the segments to pivot angularly relative to each other as the conveyor belt 1 passes around the periphery of the sprockets 10 and 14. The segments 35 provide openings 22 into which the teeth 12 and 15 of the sprockets pass in order to properly engage the conveyor belt and drive it.

As shown in Figs. 3, 4 and 5, the prior art conveyor belt on which this invention is an improvement consists of segments or links 23 which are in the form of connected U-shaped members provided with holes permitting them to be pivoted on pivot pins 24. Each of the connected U-shaped members consists of a crosspiece 25 connected between two slightly angularly divergent sidepieces 26. Gaps or spaces 27 are provided between adjacent portions of these U-shaped members in the regions of their pivoted connections on the pivot pins 24. The purpose of these spaces 27 is to prevent frictional binding of the links 23 because of their inclined side portions 26 as they pivot angularly relative to each other when passing around the sprockets 10 and 14. This regular spacing across the width of the conveyor belt which is provided by these spaces 27 is greatly responsible for lateral contraction of the belt width when it is subject to the ordinary tension applied when driving it. To help overcome this problem, a special hooked end 28 is provided at each end of the pivot pin 24. This hooked end 28 hooks around to engage the inside wall 29 of a marginal side portion 26 after passing through a hole 30 in this portion 26. This type of special end does not lend itself well to simple manufacture and is relatively expensive if done by hand.

Another disadvantage of this prior art design is the amount of bearing surface associated with the pivoted connections of the segments 23 on the pivot pins 24. This is particularly shown in the upper left hand corner of Fig. 3 and in Fig. 5. The link bearing surfaces consist of narrow surfaces 31, 32, 33 and 34 which are no thicker than the thin metal from which the segments 23 are necessarily made. It has been found that excessive wear occurs at these points with the result that the conveyor belt stretches longitudinally an excessive amount to require either special apparatus for belt tightening or else the occasional removal of an entire conveyor segment 23.

The improved design of the conveyor belt constituting this invention, as shown in Figs. 1, 2, 6, 7, 8, 9 and 10, consists of segments 35 composed of joined together U-shaped members each provided with a cross member 36 joined to two side members 37. These segments or links 35 are pivoted on pivot pins 38 adjacent the cross members 36. Each of the side portions 37 are provided with a portion 39 at either end of the cross member 36 which extends perpendicular to the cross member 36 to a bend 40 well beyond the region of the pivot pin 38. Each side portion 37 extends angularly along a portion 41 to an adjacent bend 40 where it connects to another portion 39 extending normally to an adjacent cross member 36. By having these straight portions 39 in the regions of the pivoting of the segments 35, the need for spaces in the regions 42 between adjacent segments or links 35 is precluded, since this conveyor belt will bend around the sprockets 10 and 14 without binding or causing lateral contraction of the belt. Also, the problem of belt stretching arising from lateral spacing as in the prior art is obviated. Consequently, the ends 43 of the pivot pins 38 need not be as complicated since they do not have to retain the segments 35 to retard their lateral contraction. Since this is true, the ends 43 may be in a button shape as shown in Figs. 6 and 8 which can be produced by means of a simple upsetting of the pivot pin ends or by the application of heat sufficient enough to cause flow of the metal in these regions.

As best shown in Figs. 9 and 10, the problem of belt stretching is further minimized by providing a maximum bearing surface area in regions where the segments 35 are pivoted on the pivot pins 38. Each cross member 36 is centrally provided with a curved portion 44 which has an inner radius 45 conforming to the radius of the pivot pin 38. This curved radius 48 provides a relatively large bearing area for each U-shaped portion of the links 35 in order to almost eliminate the belt stretching problem arising from wear in small localized areas as in the prior art devices.

From this description it should be apparent that an improved conveyor belt has been invented which obviates the problems associated with prior art devices.

Although one form of the improved conveyor belt of the present invention has been shown and described, it is to be understood that the conveyor belt may be modified in different ways without departing from the true scope of the appended claims.

I claim:

1. A conveyor belt comprising a plurality of members composed of sheet metal and formed into a plurality of connected U-shaped sections, each section comprising a connecting arm extending between the ends of two side arms, a circular rod extending through holes in the side arms for hinging said members together, each connecting arm having the same cross-sectional shape including a recessed rib of semi-circular cross-section extending for substantially the entire length of the arm and located in the center thereof, said rib being connected along its lateral margins between two aligned flat margins by two longitudinally extending corners curved reversely of the curvature of said rib, said rib and two corners providing longitudinal rigidity along three different longitudinal regions of the arm to thereby increase resistance to longitudinal bending of the arm, said rod engaging the connecting arms within the recesses of the recessed ribs which provide a full bearing surface for substantially the entire length of each of the connecting arms.

2. A conveyor belt comprising a plurality of members composed of sheet metal and formed into a plurality of connected U-shaped sections, each section comprising a connecting arm extending between the ends of two side arms, a circular rod extending through holes in the side arms for hinging said members together, each connecting arm having the same cross-sectional shape including a recessed rib of semi-circular cross-section extending for substantially the entire length of the arm and located in the center thereof, said rib being connected along its lateral margins between two aligned flat margins by two longitudinally extending corners curved reversely of the curvature of said rib, said rib and two corners providing longitudinal rigidity along three different longitudinal regions of the arm to thereby increase resistance to longitudinal bending of the arm, said rod engaging the connecting arms within the recesses of the recessed ribs which provide a full bearing surface for substantially the entire length of each of the connecting arms, a connecting arm of one member being positioned adjacent a connecting arm of another member alternately along the length of the rod, the curved ribs of these adjacent connecting arms being positioned alternately on opposite surfaces of the rod in such a manner that when the conveyor belt is under tension the bearing contact of the rod on the members is along the curved ribs rather than at the edges of the holes in the side arms of the sections.

References Cited in the file of this patent

UNITED STATES PATENTS

| | | |
|---|---|---|
| 1,031,499 | Wilkin | July 2, 1912 |
| 1,144,323 | Carpenter | June 22, 1915 |
| 1,840,200 | Hurxthal | Jan. 5, 1932 |
| 2,272,837 | Getz et al. | Feb. 10, 1942 |
| 2,619,306 | Van Lake | Nov. 25, 1952 |
| 2,658,607 | Moynihan | Nov. 10, 1953 |

FOREIGN PATENTS

| | | |
|---|---|---|
| 234,239 | Great Britain | May 28, 1925 |